United States Patent [19]
Fleagle et al.

[11] 3,872,720
[45] Mar. 25, 1975

[54] ASSEMBLY LINE METHOD FOR TESTING ANTI-SKID INSTALLATIONS

[75] Inventors: Joseph E. Fleagle, Overland; Richard C. Bueler, Des Peres, both of Mo.

[73] Assignee: Wagner Electric Corporation, Parsippany, N.J.

[22] Filed: Jan. 14, 1974

[21] Appl. No.: 433,275

[52] U.S. Cl. .................................................. 73/121
[51] Int. Cl. ......................................... G01m 17/00
[58] Field of Search .................. 73/2, 507, 121, 1 D

[56] References Cited
UNITED STATES PATENTS
3,275,384 9/1966 Hirzel............................ 73/121 UX
3,469,443 9/1969 Moroto et al........................ 73/121

Primary Examiner—Jerry W. Myracle

[57] ABSTRACT

Vehicle skid control installations generally comprise a sensor installed in each axle system of the vehicle for sensing wheel velocity data including rates of change in that velocity. A logic system is connected for interpreting the data sensed by the sensor. Also, the logic system commands brake control functions as required in response to the data interpreted by the logic system. A method for testing such installations includes activating the skid control installation to be tested by applying electrical and fluid power thereto. An induction coil is then placed adjacent the sensor. The coil is connected to receive a selected electrical input signal for simulating selected conditions in the sensor. The selected signal is then altered for controlling the selected conditions.

7 Claims, 4 Drawing Figures

PATENTED MAR 25 1975        3,872,720

ASSEMBLY LINE METHOD FOR TESTING ANTI-SKID INSTALLATIONS

BACKGROUND OF THE INVENTION

1. Field of the Invention:

This invention relates generally to a vehicle assembly line or maintenance test method and more particularly to a method for testing skid control installations on those vehicles.

2. Description of the Prior Art:

When skid control systems are installed on vehicles on an assembly line, for example on passenger cars or on larger commercial vehicles including busses and tractor-trailers, those systems must at some time be tested by some method to assure that the installation has been properly made.

Generally, skid control systems are provided to automatically make proper brake applications to avoid a vehicular skid which would otherwise result from improper brake applications made by the vehicle operator. Such skid control systems include wheel speed sensors which sense wheel velocity data including acceleration and deceleration. A logic system is connected for interpreting the wheel velocity data sensed by the sensors. Also, the logic system commands fluid operated valving to make brake applications as required in response to the data interpreted by the logic system. To test such systems after installation requires subjecting the vehicle wheels to either actual or simulated acceleration and deceleration and then activating the skid control system to check for proper functioning thereof.

In the past various methods have been used to check proper installation of such systems. One such method includes actual road testing. For a trailer, road testing requires a tractor to be properly connected to haul the trailer under actual road conditions and upon activation of the skid control system its proper function verifies proper installation.

Another method involves jacking up the trailer so that its wheels may be spun and locked to simulate vehicle acceleration and deceleration. Activation of the skid control system as the wheels are spun and locked and proper functioning thereof can verify proper installation.

A further method involves removing the wheel hub caps and placing a hand-held rotor over each wheel speed sensor to be tested. The rotors, when powered, will rotate about the sensor and cause an excitation therein thus simulating wheel acceleration and deceleration without actual movement of the wheels.

Each of the above-mentioned test methods are burdened by the disadvantages of being time-consuming, relatively expensive and not particularly practical to employ in that they are generally disruptive of assembly line or maintenance procedures.

There is a need for a method of testing skid control systems on vehicles which is relatively not disruptive to such procedures and which method assures proper installation of such systems.

SUMMARY OF THE INVENTION

Accordingly, the novel method of this invention provides a method for testing skid control systems on vehicles which method is generally not disruptive of assembly line and maintenance procedures. This method is quick, practical to employ and inexpensive in that it does not require movement of the wheels to simulate wheel acceleration or deceleration. Also, this method does not require either actually moving the vehicle, jacking up the vehicle to permit the wheels to spin or removal of parts of the wheel.

The foregoing is accomplished by activating the skid control installation to be tested by applying electrical and fluid power thereto. An induction coil is then placed adjacent a sensor such as may be mounted in each wheel or at some point in each axle of the vehicle. The coil is then connected to receive a selected electrical input signal for simulating selected conditions in the sensor. The selected signal is then altered for controlling the selected conditions. The electrical signal received by the coil becomes magnetically coupled to the sensor thus simulating vehicle motion. The signal may be altered to simulate an abrupt wheel lock which causes an activated, properly installed skid control system to properly function. Such proper functioning of the system can be audibly detected due to the air release from the valving provided in the system. Also, a visual check of the system functioning may be made by observing a shift in position of slack adjusters provided in the system.

Other advantages and novel features of the invention will become apparent from the following detailed description of the invention when considered in conjunction with the accompanying drawings.

BRIEF DESCRIPTION OF THE DRAWINGS

In the drawings wherein like parts are marked alike.

DESCRIPTION OF THE PREFERRED EMBODIMENT

Figure 1:
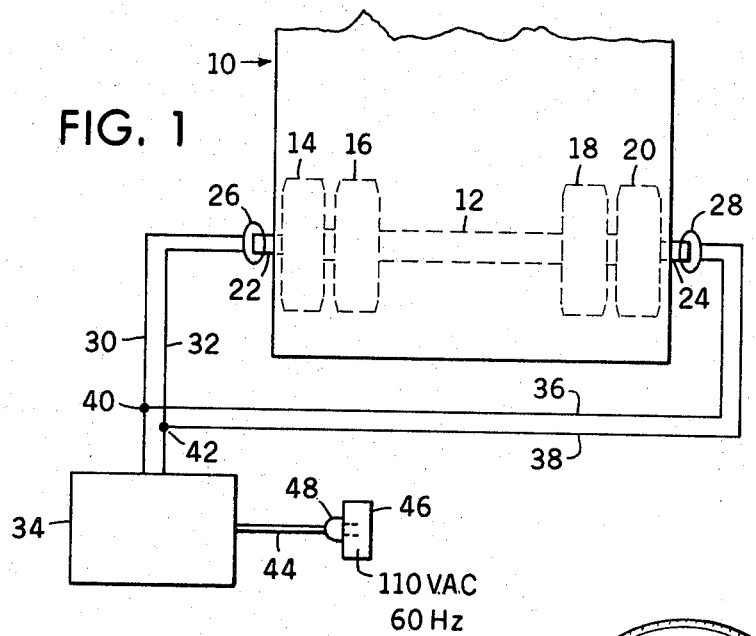
FIG. 1 diagrammatically illustrates the novel test method of this invention.
Figure 2:
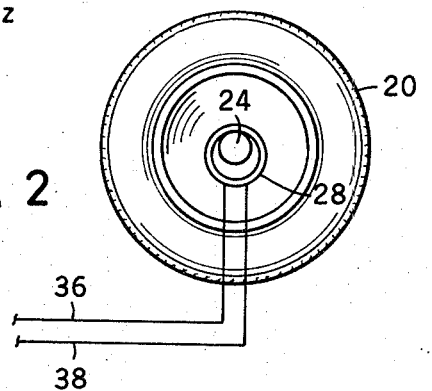
FIG. 2 diagrammatically illustrates a coil of this invention looped over a vehicle wheel hub.

In FIG. 1 a portion of a vehicle 10 such as a trailer of the type usually comprising a tractor-trailer combination, is illustrated as including axle system 12 having wheels 14, 16, 18 and 20 mounted thereon. Axle 12 terminates at opposite ends in the form of hubs 22 and 24. Induction coils 26 and 28 are looped over and suspended from hubs 22, 24, respectively. Insulated wires 30 and 32 interconnect coil 26 and test box 34. Other insulated wires 36 and 38 interconnect coil 28 with wires 30, 32 at 40, 42, respectively. In this manner coils 26, 28 are connected to test box 34 in parallel. Cord 44 is connected to power source 46 by plug 48. In FIG. 2, coil 28 is looped over and suspended from hub 24. Wires 36, 38 are provided to be connected to test box 34 and ultimately to cord 44 connected to power source 46 by plug 48.

Vehicle skid control systems, as known to one skilled in the art, generally include sensors (not shown) which are substantially circular in geometry and preferably mounted in the hub of each vehicle wheel for sensing wheel velocity data including rates of change in that velocity. Also, the system includes a logic system having various functions. Such logic systems preferably include a logic package for each axle of the vehicle, i.e., the logic system is preferably provided to interpret and compare velocity data between plural wheels on a common axle as sensed by the sensors and then to command brake control functions as required in response to the data interpreted by the logic systems. Commands given by the logic system may be due to selecting the lowest of two wheel speeds being compared on each axle (select low); by selecting the highest of the (select high) or by selecting the average (select average). However, the logic system may respond to give commands due to other criteria depending on the skid control system being used.

Activating The Skid Control Installation:

The brake control functions commanded by the logic system include control of fluid operated valves for applying and releasing the brakes of the wheels on a common axle in response to the needs of the wheels as sensed by the sensor (known as an axle system for skid control). The valves and a supply of fluid for operating them are integral parts of the skid control system carried by the vehicle. Also an electrical power supply, usually 12 volts d.c. is carried by the vehicle and is used for supplying needed electrical power to the skid control system as well as supplying the usual electrical needs of the vehicle, for example, lights, heat, etc.

In the case of a trailer which becomes part of a tractor-trailer combination, such electrical power is generally carried by the tractor and supplied to the trailer by cables or the like. Of course, such electrical power may be supplied to the trailer when the trailer is disconnected by substituting a connection to a 12 volt d.c. power cell. Such connection supplies the required electrical power to activate the skid control system as would be the case where the trailer was connected for hauling by a tractor. As stated before, a fluid supply is part of the installed skid control system, thus upon making the electrical connection to a power cell the required fluid and electrical power are readily available for activating the skid control installation.

The Coils:

Induction coils 26, 28 are placed adjacent at least one of the sensors. The coils are preferably formed of 1000 turns of number 35 magnetic wire appropriately enameled as is well known. The turns are preferably encased in a synthetic casing material such as a plasticized or rubberized type material. Two leads, one from each end of the coil, protrude externally of the casing. The leads are appropriately insulated. The internal resistance of the windings and leads is preferably at 595 ohms plus or minus 10 percent of that value. It is to be expressly understood that the number of turns, the type wire and the internal resistance thereof are suitable but are not intended as a limitation on the coil used in this novel test method. Depending on the test criteria, it is anticipated that an appropriate coil will be formed to suit that criteria.

It is preferred that a coil be placed adjacent each sensor of a common axle on the vehicle due to the aforementioned logic package arrangement, as shown in FIG. 1. However, it is anticipated that a logic system may not necessarily compare the velocities of wheels on a common axle and that in such a situation it may be appropriate to apply a test coil adjacent a sensor in the hub of a single wheel of a given axle or adjacent a sensor otherwise positioned along the axle rather than on wheels on opposite ends of that axle to simulate motion in the respective sensor of that wheel and to test the skid control installation for proper functioning. Due to its substantially circular geometry, similar to the sensor, the coil can be looped over and suspended from the hub cap of the appropriate wheel or wheels. Thus the coil 28 is placed adjacent the sensor which is mounted within the hub 24 of the wheel 20 (see FIG. 2).

Connecting The Coil:

The coils 26, 28 are connected to receive a selected electrical input signal for simulating selected conditions in the sensor. This can be accomplished by connecting the leads to wires such as 30, 32 and 36, 38. Such wires, if desired could be directly connected to a common household extension cord 44 having plug 48 thereon. The plug could be inserted in a readily available 110 volt a.c. 60 hz outlet to supply a signal to the coil. The signal would of course comprise a certain voltage and current at a given frequency. The signal could be altered by interrupting that signal such as by disconnecting plug 48 from power source 46.

Figure 3:
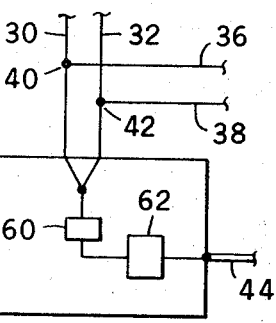
FIG. 3 diagrammatically illustrates a switch and transformer arrangement in the test box.

Test box 34 may interconnect wires 30, 32 and 36, 38 with cord 44. The test box may include, for example a momentary contact switch 60 for interrupting the signal and a transformer 62 provided to reduce the 110 volts a.c. down to, for example 12 volts a.c. as is diagrammatically illustrated in FIG. 3. The voltage is reduced to decrease the strength of the field created when the signal is received by the coil. Reducing the voltage does not affect the 60 hz frequency of the signal which influences the sensor as to the wheel condition as seen by the sensor, i.e. constant velocity, acceleration or deceleration. When the switch is actuated, the field is established and the sensor is influenced thereby, i.e. the 60 hz a.c. current flows into the coils 26, 28 and those coils are magnetically coupled into the sensors. This simulates vehicle motion. Upon opening the switch current ceases to flow and the sensor ceases to be influenced by the field. Such action simulates an abrupt wheel lock which triggers a response by the skid control system. Thus by operating the switch the signal is altered to interrupt the selected 60 hz signal for controlling the simulated selected conditions in the sensor.

The 110 volts a.c. 60 hz signal is used because it is commonly available and is sufficient to simulate an acceptable wheel speed for purposes of the test. Approximately 8 hz is sufficient to simulate a wheel velocity roughly equivalent to 1 m.p.h. so that a 60 hz frequency simulates approximately 7–8 m.p.h. This is sufficient to simulate a constant wheel speed sufficient for test purposes and upon removal of the signal, the sensor senses the abrupt wheel speed drop to a value sufficient to simulate a lock up.

Figure 4:
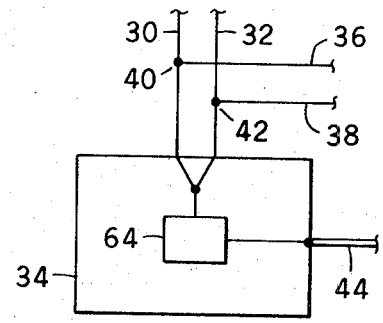
FIG. 4 diagrammatically illustrates a signal generator in the test box.

It is further anticipated that the signal could be altered other than by interruption thereof either by disconnecting plug 48 from source 46 or by opening a switch provided in test box 34. For example, test box 34 can include a signal generator 64 to alter the 110 volt a.c. signal as is diagrammatically illustrated in FIG. 4. The signal generator can be connected to coils 26, 28 to modulate the 60 hz frequency of the input signal to other frequencies simulating a range of selected conditions in the sensor. Such modulation could test various functions of the logic system since as stated above, it is the frequency of the signal which causes the sensor to sense a certain wheel condition. Thus a range of preselected frequencies may be produced by modulating the 60 hz input signal through a signal generator for simulating various wheel speeds in the sensor. Therefore, in addition to sensing wheel lock ups as distinguished from a constant velocity, the sensor and logic system can determine sudden rates of change in that constant velocity such as might be caused by, for example, a sudden change in conditions of the road surface. since the logic system is capable of recognizing and determining such sudden rates of change as distinguished from wheel lock up situations, it may be desirable to test the skid control installation with regard to all of its operable functions in which case modulating the frequency of the input signal is required.

Operation:

The skid control test method of this invention operates on the principle of induced sensor excitation due to the sensor being exposed to an electrical field. When the selected signal is applied to the coil assemblies placed over the wheel hubs containing the sensors, the signal produces the desired field about the hubs thereby inducing the 60 hz excitation in the sensor. When the signal is suddenly removed the field is also removed and the sensor excitation ceases. This sudden removal of the signal simulates an abrupt wheel lock which triggers a response from the skid control system.

Thus, the skid control installation is activated for operation by applying the required electrical and fluid power thereto. The coil or coils are then looped over and may be suspended from the wheel hub. The coil is then connected to receive the selected input signal for simulating selected conditions in the sensor. Then, either by disconnecting, interrupting or modulating, the signal is altered to control the selected conditions for testing the various functions of the skid control installation.

Obviously many modifications and variations of the present invention are possible in the light of the above teachings. It is therefore to be understood that within the scope of the appended claims the invention may be practiced otherwise than as specifically described.

Having thus described the invention in its best embodiment and mode of operation, that which is desired to be claimed by Letters Patent is:

1. A method for testing vehicle skid control installations comprising at least one sensor installed in each axle of the vehicle for sensing wheel velocity data including rates of change in that velocity, a logic system connected for interpreting the data sensed by the sensor and for commanding brake control functions as required in response to the data interpreted by the logic system, the method including the steps of:

activating the skid control installation to be tested by applying electrical and fluid power thereto;
    placing an induction coil adjacent each sensor to be tested;
    connecting the coil to receive a selected electrical input signal for simulating selected conditions in the sensor; and
    altering the selected signal for controlling the selected conditions.

2. The method of claim 1, wherein:
    the signal is altered by operation of a switch connected to the coil to interrupt the selected signal.

3. The method of claim 1, wherein:
    the signal is altered by operation of a signal generator connected to the coil to modulate the frequency of the signal for simulating a range of selected conditions in the sensor and for testing various functions of the logic system.

4. The method of claim 1, wherein:
    a sensor is installed in each wheel hub of a common axle.

5. The method of claim 4, wherein:
    the signal is altered by operation of a switch connected to the coil to interrupt the selected signal.

6. The method of claim 4, wherein:
    the signal is altered by operation of a signal generator connected to the coil to modulate the frequency of the signal for simulating a range of selected conditions in the sensor and for testing various functions of the logic system.

7. The method of claim 1, wherein:
    the sensor and the coil are of substantially similar geometric configuration.

* * * * *